United States Patent
Avakian et al.

[19]

[11] Patent Number: 5,793,145
[45] Date of Patent: Aug. 11, 1998

[54] END CAP TO ROTOR ATTACHMENT

[75] Inventors: Kevin M. Avakian, Tewksbury; Gita P. Rao, Belmont; Dariusz A. Bushko, Hopkinton; John R. Oleksy, Maynard, all of Mass.

[73] Assignee: Chrysler Corporation, Auburn Hills, Mich.

[21] Appl. No.: 679,600

[22] Filed: Jul. 11, 1996

Related U.S. Application Data

[63] Continuation of Ser. No. 642,142, May 2, 1996, abandoned.

[51] Int. Cl.[6] .................................................. H02K 3/46
[52] U.S. Cl. .......................... 310/270; 310/261; 310/211; 310/233
[58] Field of Search .................................. 310/270, 261, 310/211

[56] References Cited

U.S. PATENT DOCUMENTS

| | | | |
|---|---|---|---|
| 4,469,970 | 9/1984 | Neumann | 310/156 |
| 4,631,456 | 12/1986 | Drescher et al. | 318/140 |
| 4,739,207 | 4/1988 | Ying et al. | 310/214 |
| 4,900,962 | 2/1990 | Hockney et al. | 310/90.5 |
| 4,912,354 | 3/1990 | Frank | 310/271 |
| 4,961,352 | 10/1990 | Downer et al. | 74/5.46 |
| 4,968,911 | 11/1990 | Denk | 310/42 |
| 5,068,560 | 11/1991 | Lundquist | 310/125 |
| 5,268,603 | 12/1993 | Even | 310/64 |
| 5,291,975 | 3/1994 | Johnson et al. | 188/378 |
| 5,319,273 | 6/1994 | Hockney et al. | 310/90.5 |
| 5,353,656 | 10/1994 | Hawkey et al. | 74/5.41 |
| 5,372,213 | 12/1994 | Hasebe et al. | 180/65.6 |
| 5,396,140 | 3/1995 | Goldie et al. | 310/268 |
| 5,442,288 | 8/1995 | Fenn et al. | 324/244 |
| 5,444,319 | 8/1995 | Nakamura et al. | 310/211 |
| 5,465,015 | 11/1995 | Anastas et al. | 310/26 |
| 5,492,192 | 2/1996 | Brooks et al. | 180/165 |
| 5,513,719 | 5/1996 | Motoro et al. | 180/65.4 |
| 5,519,269 | 5/1996 | Lindberg | 310/58 |

OTHER PUBLICATIONS

Popular Science Magazine, Emerging Technologies for the Supercar, Jun. 1994.
NASA Tech Briefs, The Digest of New Technology, Jun. 1995, vol. 19, No. 6, pp. 12 and 13.

*Primary Examiner*—Thomas M. Dolgherty
*Assistant Examiner*—Timothy A Williams
*Attorney, Agent, or Firm*—Mark P. Calcaterra

[57] ABSTRACT

An induction motor includes a stator defining stator inner and outer diameters extending about a longitudinal axis, the stator includes a plurality of windings extending longitudinally and circumferentially about the longitudinal axis between the stator inner diameter and the stator outer diameter and passing an electric current therethrough to create a magnetic field, a rotor extends along the longitudinal axis having a rotor length and a rotor outer diameter less than the stator inner diameter, the rotor being rotatable about the longitudinal axis relative to the stator, the rotor including at least one electrically conductive bar extending parallel to the longitudinal axis adjacent the rotor outer diameter for receiving an induced current due to the magnetic field, an end cap at each end of the rotor contacting the at least one electrically conductive bar and a capture ring attached to each end of the rotor to prevent movement between the end caps and the rotor.

8 Claims, 6 Drawing Sheets

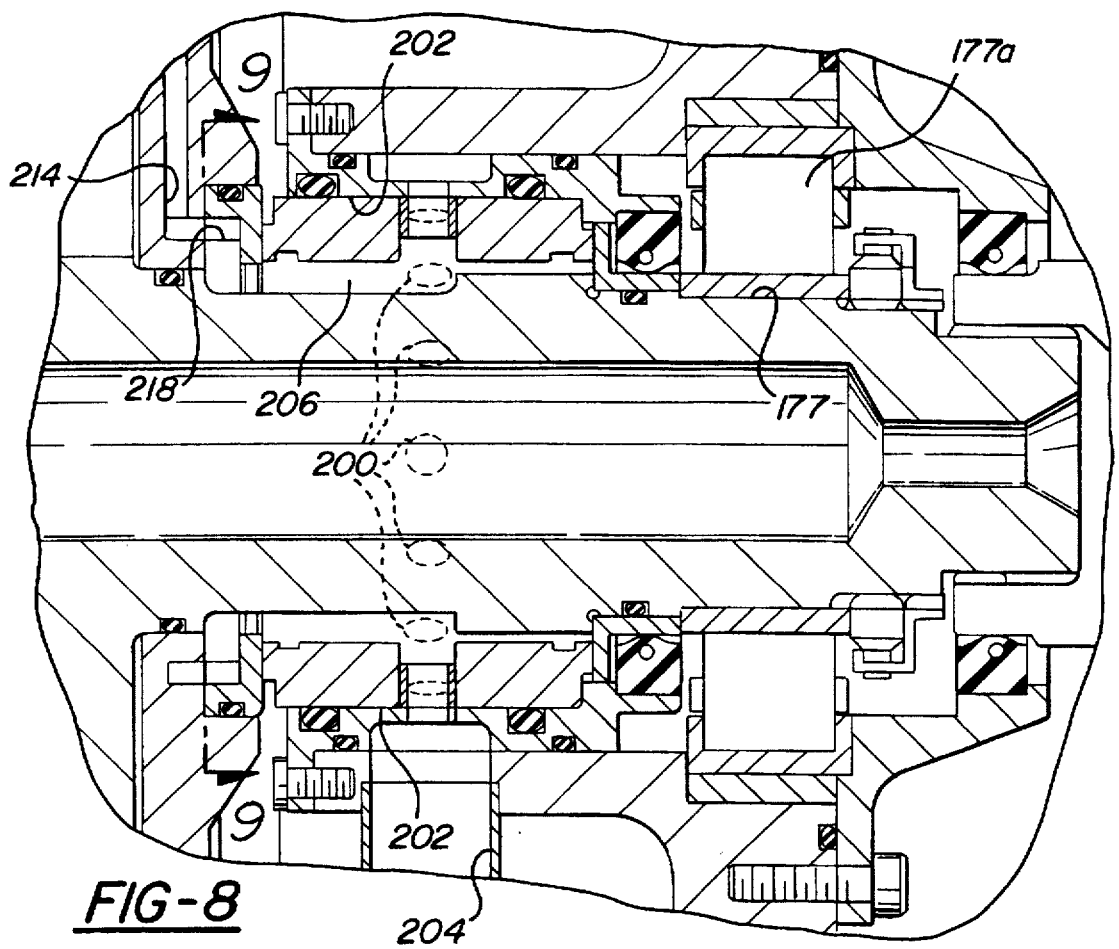
FIG-8
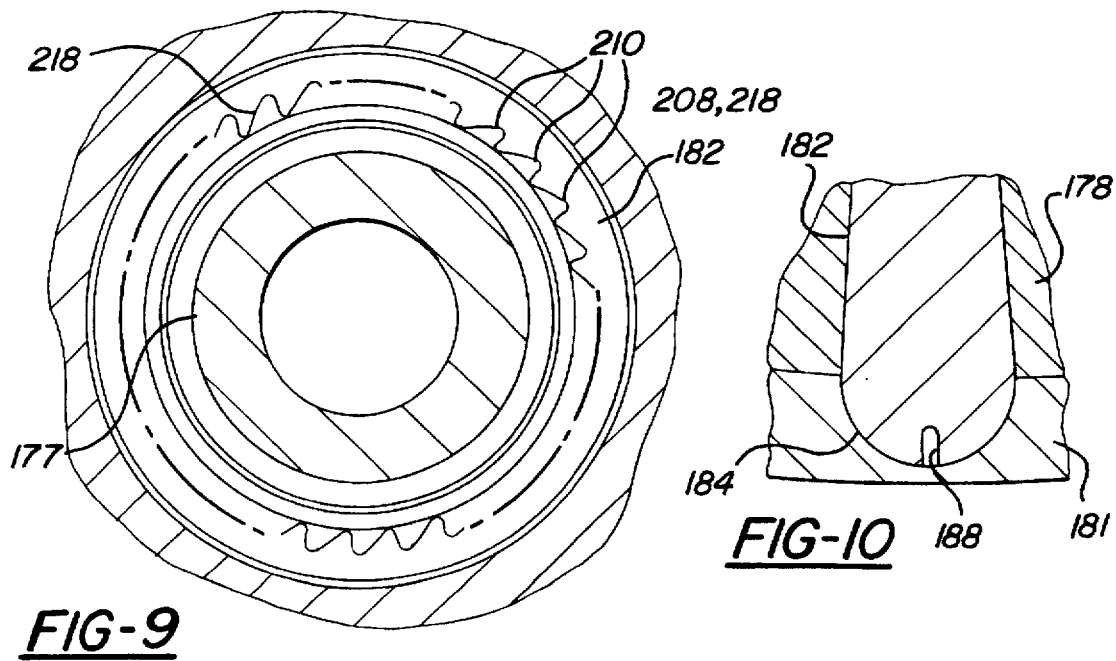
FIG-9
FIG-10

END CAP TO ROTOR ATTACHMENT

CROSS-REFERENCE TO RELATED APPLICATION(S)

This is a continuation of application U.S. Ser. No. 08/642,142 filed May 2, 1996, now abandoned. Furthermore, this application pertains to the following U.S. patent applications disclosing common subject matter:

Ser. No. 08/678,356 for an invention entitled "HYBRID MOTOR VEHICLE";

Ser. No. 08/642,165 for an invention entitled "STATOR COOLING ASSEMBLY" now U.S. Pat No. 5,731,643;

Ser. No. 08/642,145 for an invention entitled "INDUCTION MACHINE COMMUTATOR";

Ser. No. 08/642,930 for an invention entitled "COOLING OF TURBOALTERNATOR FOR HYBRID MOTOR VEHICLE" now U.S. Pat No. 5,653,640;

Ser. No. 08/642,086 for an invention entitled "COMPRESSOR OF TURBOALTERNATOR FOR HYBRID MOTOR VEHICLE";

Ser. No. 08/642,169 for an invention entitled "A GIMBAL SUPPORT SYSTEM WITH UNIDIRECTIONAL ROLL STIFFNESS";

Ser. No. 08/641,962 for an invention entitled "METHOD OF FORMING A RIM CONSTRUCTION FOR A ROTOR";

Ser. No. 08/642,099 for an invention entitled "ASSEMBLY PROCESS OF MAGNET ONTO A ROTOR";

Ser. No. 08/641,964 for an invention entitled "SUBCRITICAL SPOKE FOR HUB TO ROTOR ATTACHMENT";

Ser. No. 08/642,144 for an invention entitled "STATOR FABRICATION PROCESS";

Ser. No. 08/641,967 for an invention entitled "CONTROLLER FOR TURBOALTERNATOR";

Ser. No. 08/641,924 for an invention entitled "SOFT MAGNET FOR A ROTOR";

Ser. No. 08/642,166 for an invention entitled "HYDRAULIC FIT OF TURBOALTERNATOR FOR HYBRID MOTOR VEHICLE";

Ser. No. 08/642,091 for an invention entitled "LAMINATED BALANCE BARS FOR AN ENERGY STORAGE APPARATUS";

Ser. No. 08/642,100 for an invention entitled "METHOD OF ASSEMBLING A STATOR";

Ser. No. 08/641,923 for an invention entitled "SPOKE SHAPE FOR HUB TO ROTOR ATTACHMENT";

Ser. No. 08/642,130 for an invention entitled "FLYWHEEL CONTROLLER";

Ser. No. 08/642,082 for an invention entitled "CENTER ALIGNED PWM";

Ser. No. 08/678,284 for an invention entitled "SOLID ROTOR ASSEMBLY";

Ser. No. 08/678,307 for an invention entitled "TURBOALTERNATOR FOR HYBRID MOTOR VEHICLE";

Ser. No. 08/724,292 for an invention entitled "ROTOR SQUIRREL CAGE CONSTRUCTION";

Ser. No. 08/891,490 for an invention entitled "SEGMENTED RIM CONSTRUCTION FOR A ROTOR"; and Ser. No. 08/916,180 for an invention entitled "ROTOR SPEED ESTIMATOR".

This application further pertains to the following U.S. Patents disclosing common subject matter:

U.S. Pat. No. 5,696,414 for an invention entitled "SLIDING SPOKE ROTOR TO HUB ATTACHMENT";

U.S. Pat. No. 5,637,939 for an invention entitled "POCKET ATTACHMENT TO RIM"; and U.S. Pat. No. 5,721,459 for an invention entitled "OUTPUT VOLTAGE REGULATION USING ROTOR GROWTH".

BACKGROUND OF THE INVENTION

1. Field of the Invention

The present invention relates generally to powertrain systems in vehicles, and, more particularly, to a hybrid powertrain system in a motor vehicle.

2. Description of the Related Art

Since the advent of powered motor vehicles, many different powertrain systems have been used, including a steam engine with a boiler, an electric motor with a storage battery, or an internal combustion engine with fossil fuel.

Although fossil fuel emerged as the fuel of choice for motor vehicles, recent concerns regarding fuel availability and increasingly stringent federal and state emission regulations have renewed interest in alternative powered motor vehicles. For example, motor vehicles may be powered by methanol, ethanol, natural gas, electricity or a combination of fuels.

A dedicated electric powered motor vehicle offers several advantages: electricity is readily available; an electric power distribution system is already in place; and an electric powered motor vehicle produces virtually zero emissions. There are several technological disadvantages that must be overcome before electric powered motor vehicles gain acceptance in the marketplace. For instance, the range of an electric powered motor vehicle is limited to approximately 100 miles, compared to about 300 miles for a fossil fuel powered motor vehicle. Further, the top speed is about half that of a similar fossil fuel powered motor vehicle. There is, therefore, a need in the art for a powertrain to provide an electric motor for a motor vehicle which capable of performing as dynamically as an internal combustion engine.

SUMMARY OF THE INVENTION

It is an object of the present invention to provide an induction motor for a motor vehicle.

It is another object of the present invention to maximize the sensitivity of a rotor to the magnetic fields created by a stator of the induction motor.

According to the foregoing objects, an induction motor includes a stator defining stator inner and outer diameters extending about a longitudinal axis. The stator includes a plurality of windings extending longitudinally and circumferentially about the longitudinal axis between the stator inner diameter and the stator outer diameter. The windings pass an electric current therethrough to create a magnetic field. A rotor extends along the longitudinal axis having a rotor length and a rotor outer diameter less than the stator inner diameter. The rotor is rotatable about the longitudinal axis relative to the stator. The rotor includes at least one electrically conductive bar extending parallel to the longitudinal axis adjacent the rotor outer diameter for receiving an induced current due to the magnetic field. An end cap at each end of the rotor contacts the at least one electrically conductive bar and a capture ring attached to each end of the rotor to prevent movement between the end caps and the rotor.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 8 is an enlarged view of circle 8 in FIG. 5.

FIG. 9 is a sectional view taken along lines 9—9 of FIG. 8.

FIG. 10 is a view taken along lines 10—10 of FIG. 5.

DESCRIPTION OF THE PREFERRED EMBODIMENT(S)

Figure 1:
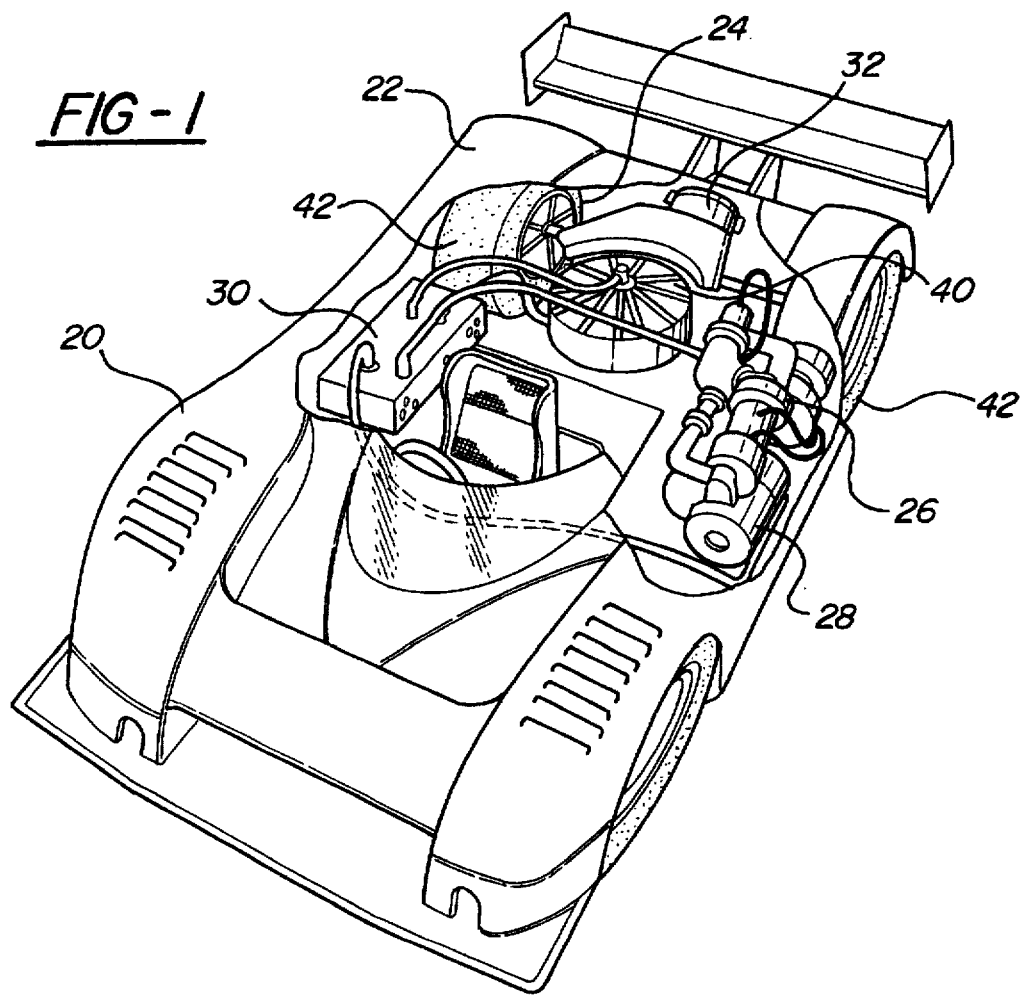
FIG. 1 is a perspective view partially cut away of a motor vehicle according to the present invention.
Figure 2:
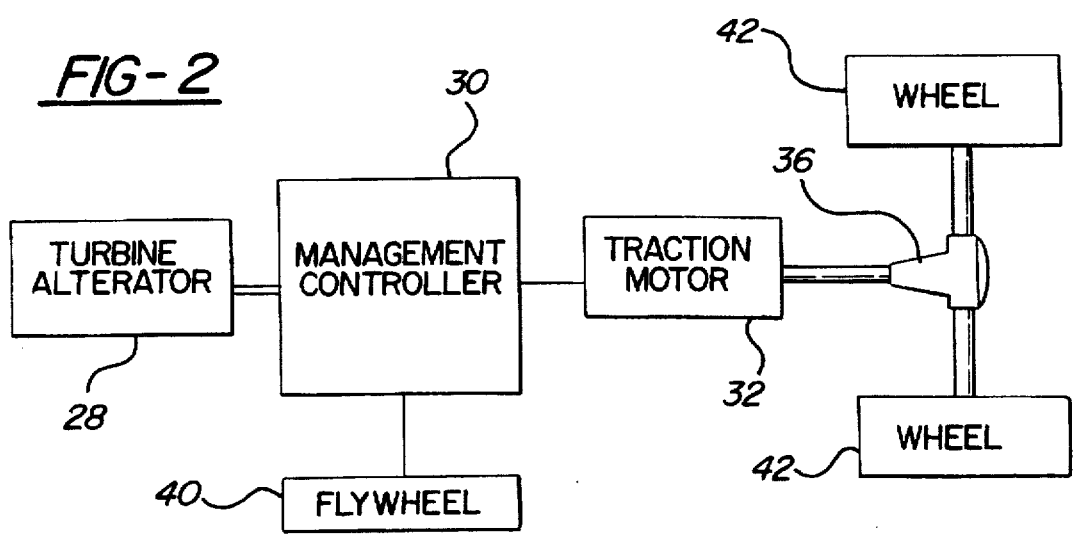
FIG. 2 is a block diagram of a powertrain for the motor vehicle of FIG. 1.

Referring to FIGS. 1 and 2, a hybrid powertrain system 22, according to the present invention, is illustrated for a motor vehicle 20. The vehicle 20 is partially shown in a cut away view illustrating the hybrid powertrain system 22 disposed within a chassis 24. The hybrid powertrain system 22 includes a turbine engine 26, which in this example, is fueled by a fossil fuel such as liquefied natural gas. The turbine engine 26 spins an alternator 28 to generate electric power to operate the vehicle 20. It should be appreciated that, in this example, there are two alternators 28 that run at different speeds, such as 60,000 rpm and 100,000 rpm, to produce electrical power approximately equal to five hundred (500) horsepower. It should also be appreciated that the turbine engine 26 and the alternator 28 may be referred to as a turboalternator.

The hybrid powertrain system 22 also includes a power or vehicle management controller 30 electrically connected to and in communication with the turbine engine 26 and alternator 28. The vehicle management controller 30 manages the distribution of electrical power from the alternator 28 to a traction or induction motor 32 using a three phase variable frequency alternating current (VFAC). In this example the traction motor 32 is an AC induction traction motor 32 capable of producing seven hundred fifty (750) horsepower. The traction motor 32 transfers its power to a drivetrain 36 to provide movement of the vehicle 20.

The hybrid powertrain system 22 further includes an energy storage apparatus such as a flywheel 40. The flywheel 40 is electrically connected to and in communication with the vehicle management controller 30. The vehicle management controller 30 directs the electrical power from the alternator 28 to the flywheel 40 for storage during periods of low power demand. The vehicle management controller 30 also directs the stored electrical power from the flywheel 40 to the traction motor 32 during periods of high power demand.

In operation, a signal from an operator such as a driver to accelerate the vehicle 20 is communicated to the vehicle management controller 30. The vehicle management controller 30 directs the alternator 28 and, if necessary, the flywheel 40, to supply electrical power to the traction motor 32 and eventually to wheels 42. If the power need of the traction motor 32 is low, the vehicle management controller 30 directs the excess power capacity from the alternator 28 into the flywheel 40 for storage.

Preferably, the hybrid powertrain system 22 also includes various sensors which are conventional and well known in the art. The outputs of these sensors communicate with the vehicle management controller 30. It should also be appreciated that the vehicle 20 includes other hardware not shown, but conventional in the art to cooperate with the hybrid powertrain system 20.

Figure 3:
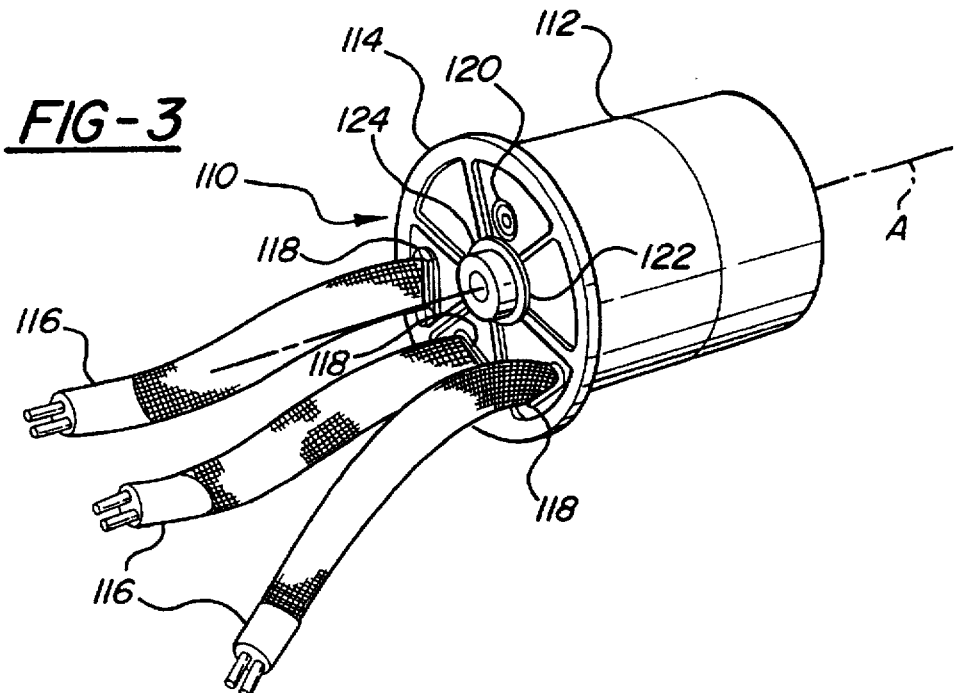
FIG. 3 is a perspective view of an induction motor, according to the present invention, of the powertrain of FIG. 2.
Figure 5:
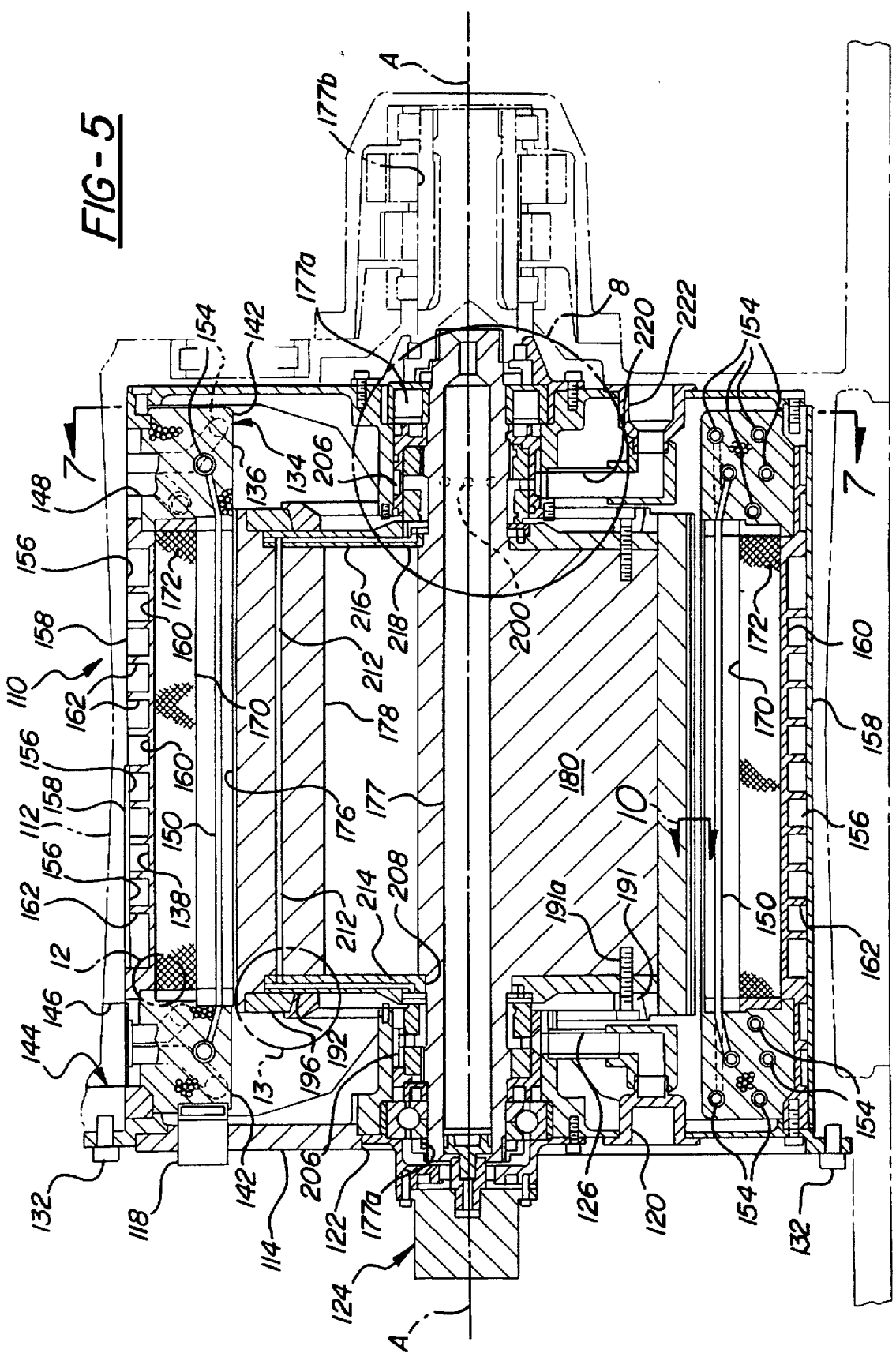
FIG. 5 is a sectional view taken along lines 5—5 of FIG. 6.

Referring to FIGS. 3 and 5, an induction motor, according to the present invention, is generally indicated at 110. The induction motor 110 is the traction motor 32 which is used to drive the wheels 42 of the vehicle 20. The induction motor 110 includes an outer housing 112 and end plates 114. Three insulated electrical conductors 116 carry electrical current in three separate and distinct phases to the induction motor 110. The end plate 114 includes five openings, the first three openings 118 allow the electromagnetic conductors 116 to pass therethrough. A fourth opening 120 is a fluid port through which fluid passes for purposes of cooling, discussed subsequently. The fifth opening 122 allows a portion of the rotor 124, discussed subsequently, to pass therethrough.

Figure 11:
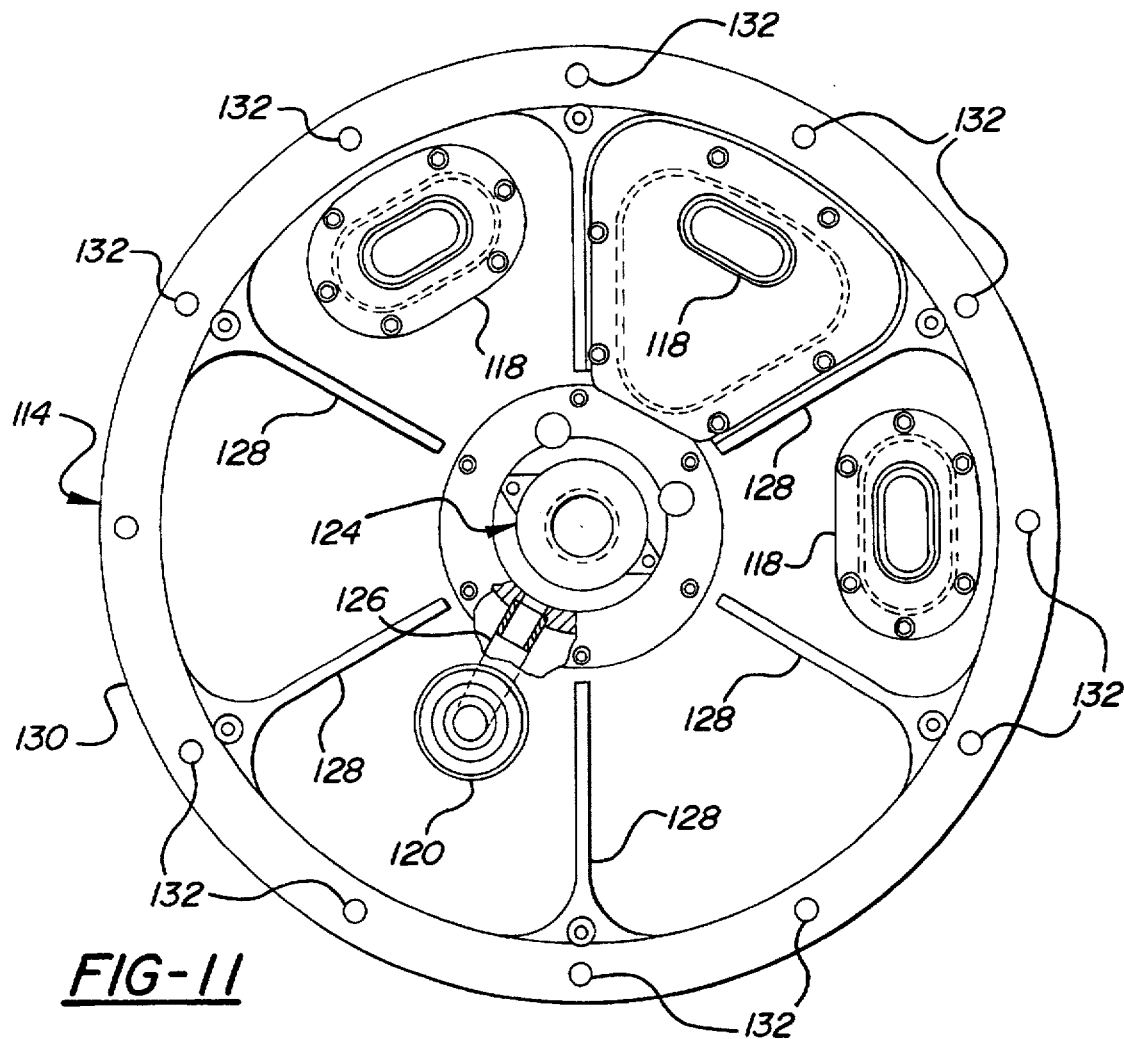
FIG. 11 is an end view of the induction motor of FIG. 3.

Referring to FIG. 11, the end plate 114 is shown in greater detail. The fluid port 120 is in fluid communication with the rotor 124 through a fluid channel 126. The end plate 114 also includes six spokes 128 which extend radially inwardly from a outer diameter of the outer housing 112. Bolts 132 secure the end plate 114 to the outer housing 112.

Figure 7:
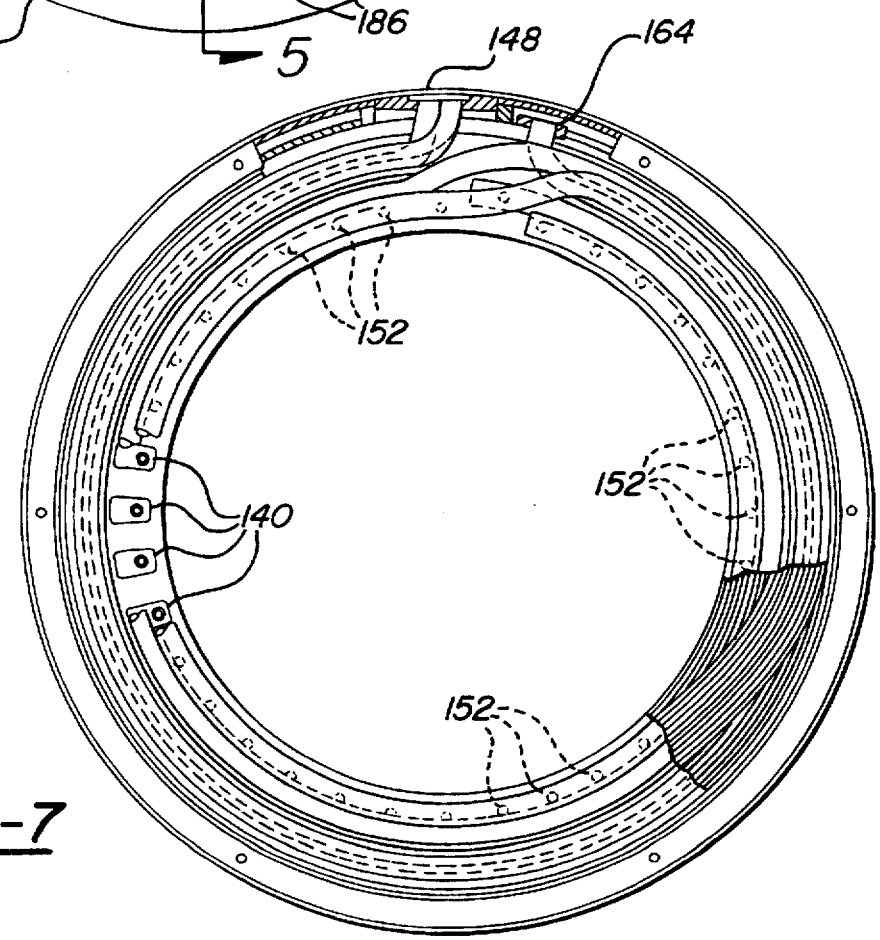
FIG. 7 is a view, partially cut away, taken along lines 7—7 of FIG. 5.

A stator is generally shown at 134 in the FIG. 5. The stator 134 defines a stator inner diameter 136 and a stator outer diameter 138. The stator 134 also defines a longitudinal axis A which extends through the stator 134. The stator 134 includes a plurality of windings 140 which extend along the stator inner diameter 136 along axes parallel to the longitudinal axis A. As may be seen in FIG. 7, each of the plurality of windings 140 are keystone in shape. More specifically, each of the plurality of windings 140, four shown in FIG. 7, are somewhat trapezoidal in shape. Each of the plurality of windings 140 are located equidistantly from each other at 12 degree (12°) intervals. The passing of the three phase current through specific windings 140 creates a magnetic field which extends past the stator inner diameter 136 toward the longitudinal axis A. The magnetic fields are not shown in the FIGS. As illustrated in FIG. 5, end turns 142 extend around the stator inner diameter 136 on each end of the stator 134. The end turns 142 are convenient way to get a closed circuit for each of the plurality of windings 140.

A stator thermal exchanging fluid circuit is generally shown at 144 in the FIG. 5. The stator thermal exchanging fluid circuit 144 extends both through and about the stator 134 whereby the stator thermal exchanging fluid circuit 144 exchanges thermal energy with the stator 134. The stator thermal exchanging fluid circuit 144 includes an inlet port 146 and an outlet port 148. The inlet port 146 receives a coolant fluid therein. After passing through the stator thermal exchanging fluid circuit 144, the outlet port 148 transfers the fluid out where the thermal energy can subsequently be transferred.

At least one conduit 150 extends longitudinally or axially between the inlet port 146 and the outlet port 148 between the plurality of windings 140. Although only two conduits 150 are shown in FIG. 5, it may be seen in FIG. 7 that a plurality of conduits 150 extend around the stator inner diameter 136 adjacent the plurality of windings 140. In FIG. 7, the conduits 150 are represented by conduit inlet holes 152. The conduits 150 are preferably made of thin walled stainless steel tubing which is electrically isolated in a conventional manner. It should be appreciated that the thickness of the wall is such to minimize eddy current effects while still providing coolant pressure containment.

A second set of conduits 154 are wrapped circumferentially around each end of the stator 134 within the end turns 142. The second set of conduits 154 are used to supply the pathway from which the conduit openings 152 extend through, as well as provide a thermal exchanging fluid interface between the stator thermal exchanging fluid circuit 144 and the end turns 142.

The stator thermal exchanging fluid circuit 144 also includes at least one channel 156 extending between the inlet port 146 and the outlet port 148. The channel 156 extends along the stator 134. The channel 156 is disposed adjacent the stator outer diameter 138 on the outside thereof. The channel 156 includes a channel upper surface 158, a channel lower surface 160, and at least one inner channel side surface 162 extending between the channel upper surface 158 and the channel lower surface 160. The outer diameter 138 of the channel lower surface 160 is coated with a material which is thermally conductive and electrically insulative, such as aluminum oxide (FIG. 5) having a thickness of approximately 0.001 inch for electrical insulation purposes.

Figure 4:
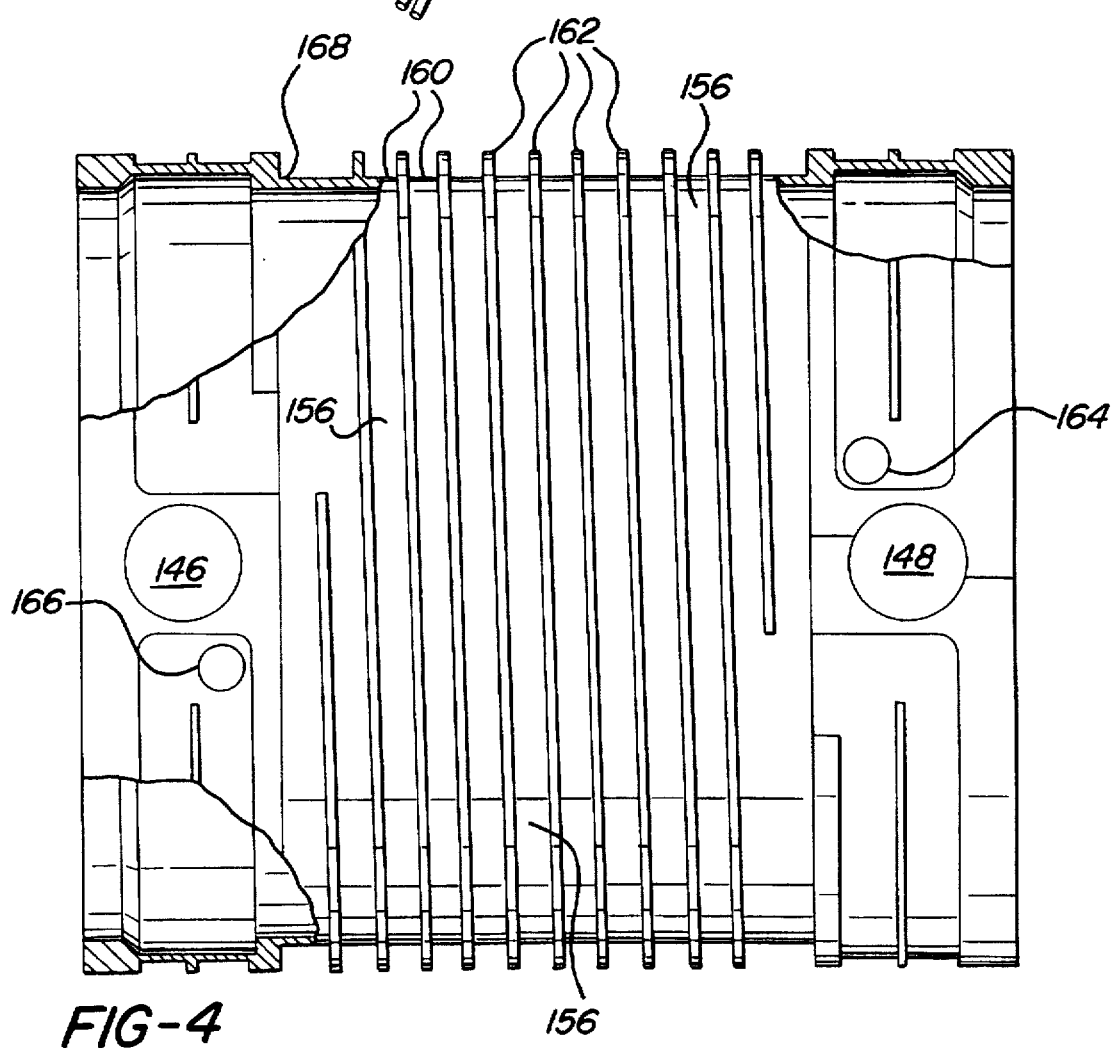
FIG. 4 is a side view of a cooling jacket without a cover, partially cut away, for the induction motor of FIG. 3.

In one embodiment, the channel outer surface 158 is the outer housing 112 of the induction motor 110. As may be seen in FIG. 7, a single outlet conduit 164 represents the communication between the channel 156 and the outlet port 148 of the stator thermal exchanging fluid circuit 144. In the same manner, a single conduit (not shown) on the inlet port 146 extends through the end turn 142 and then up toward the channel 156. These openings are best represented in FIG. 4. More specifically, fluid is input through inlet port 146. A portion of the fluid extends out into the channel 156 through channel inlet port 166. The fluid flows over the channel 156, the complete structure of which is commonly referred to as a cooling jacket 168, in a manner set forth by the channel inner side surfaces 162. The fluid then exits the outlet conduit 164 so that the fluid may pass through the end turn 142 adjacent the outlet port 148 prior to exiting the outlet port 148. In one embodiment, the channel inner side surface 162 is a helical single surface wrapping around the stator 134 within the cooling jacket 168 to create a single channel through which the fluid must pass to exit the outlet port 148. As may be seen in FIG. 4, the cooling jacket 168 is a hollow structure into which the stator 134 is disposed.

During the fabrication of the stator 134, the cooling jacket 168 is heated to expand. The cooling jacket 168 is cooled after the stator 134 has been inserted therein; the cooling of which creates a positive or shrink fit between the cooling jacket 168 and the stator 134 such that there is no lost motion therebetween. More specifically, the cooling jacket 168 contracts upon cooling until the stator 134 prevents the cooling jacket 168 from contracting any further. The channel 156 is fabricated through welding processes to weld the walls of the channel 156 together to prevent fluid from passing therethrough in a manner other than through the channel 156 as designed.

Figures 12, 13:
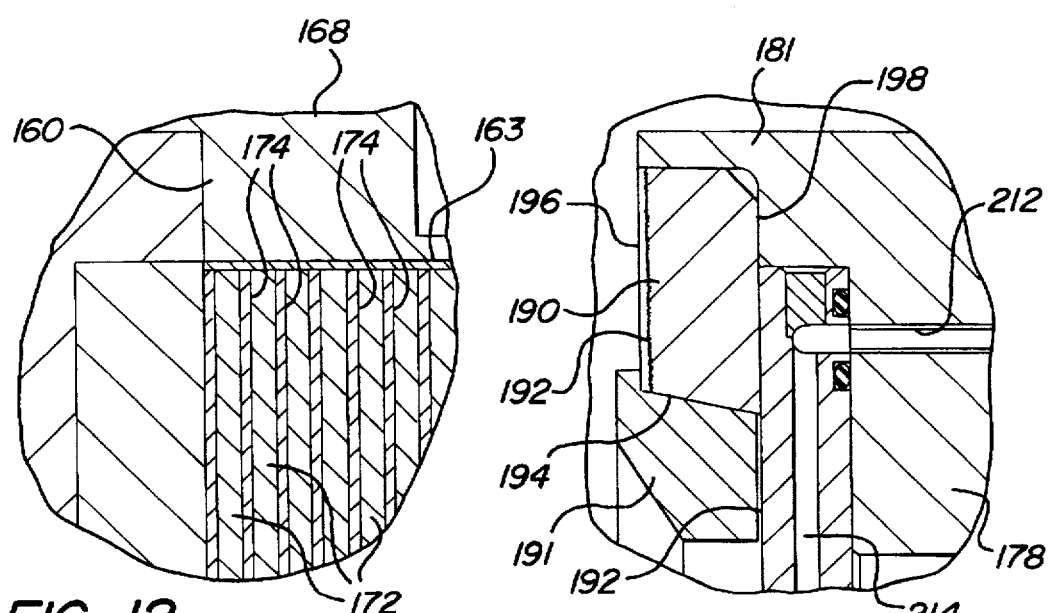
FIG. 12 is an enlarged view of circle 12 in FIG. 5.
FIG. 13 is an enlarged view of circle 13 of FIG. 5.

Directly below the channel 156 is a stator stack 170. The stator stack 170 extends longitudinally and circumferentially around the longitudinal axis A. The stator stack 170 extends along the longitudinal axis A radially inwardly from the stator outer diameter 138 toward the stator inner diameter 136. The stator stack 170 includes a plurality of laminations 172, as best seen in FIG. 12. Each of the plurality of laminations 172 extends in a plane perpendicular to the longitudinal axis A in equidistantly spaced relation to each other. Each of the laminations 172 have a thickness of 0.006 inch. An oxide layer 174 having a thickness of 0.001 inch separates each of the plurality no more than laminations 172. Each of the plurality of laminations 172 is fabricated from a metal alloy, HYPERCO 50 in one embodiment. The oxide layer 174 is formed between the laminations 172. It should be appreciated that the oxide layer 174 which covers each of the plurality of laminations 172 is thin with respect to the laminations 172.

Referring to FIG. 5, the rotor 124 extends along the longitudinal axis A having a rotor outer diameter 176. The rotor 124 rotates about a rotor shaft 177 supported at each end by a bearing 177a. Once the rotor shaft 177 is rotating, the rotational energy is generated thereby is transferred to the drivetrain 36 through a drive shaft 177b. Although the rotor shaft 177 is hollow, no cooling fluid passes therethrough. The rotor outer diameter 176 is less than the stator diameter 138 such that the rotor 124 is freely rotatable therein. The rotor 124 includes a hoop portion 178 which extends radially inwardly toward the longitudinal axis A from the rotor outer diameter 176. The hoop portion 178 is a solid unitary structure made of an Aeromet 100 material.

The solid hoop portion 178 provides outer diameter hoop continuity for maximum strength at high rotor speeds. The solid hoop portion 178 extends out from the longitudinal axis A via six spokes 180, one of which is shown in FIG. 5 due to the non-linear cross-section. The solid hoop portion 178 also includes an extension 181 extending longitudinally adjacent an end cap 190 to be described to retain the end cap 190 against radial movement.

Figure 6:
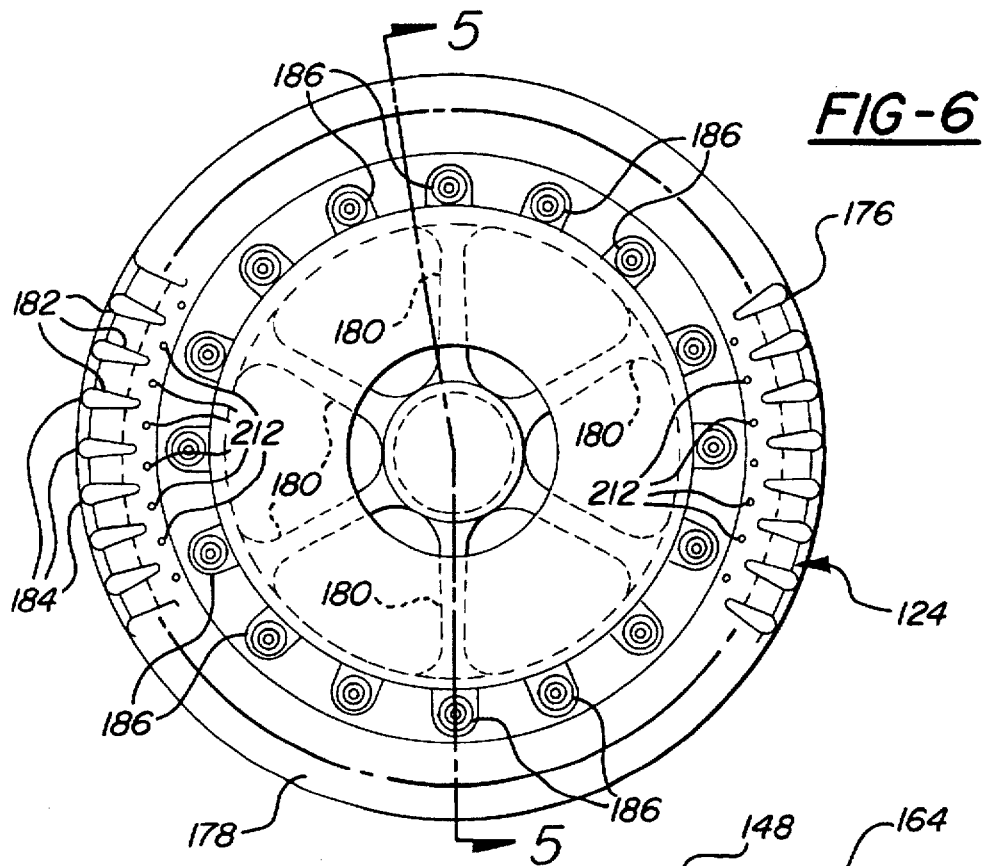
FIG. 6 is an end view of a rotor of the induction motor of FIG. 3.

Referring to FIG. 6, the solid hoop portion 178 includes a plurality of slots of nonuniform cross-section cut through the length of the rotor 124 adjacent the rotor outer diameter 176. Within each slot, an electrically conductive bar 182 is forced therein under the outer covering 181. Each of the electrically conductive bars 182 extend along a bar axis parallel to the longitudinal axis A adjacent the rotor outer diameter 176. The bars 182 are tapered and press fit into the slots. Due to magnetic fields created by the electrical currents passing through the plurality of windings 140, a current is induced in the electrically conductive bars 182. As a result, the electrically conductive bars 182 and rotor 124 are forced to move relative to their existing position, rendering the rotation of the rotor 124. The electrically conductive bars 182 are spaced equidistantly from each other about the rotor outer diameter 176.

The electrically conductive bars 182 are fabricated from a copper alloy. More specifically, these bars 182 are fabricated from copper with 0.6 to 0.15 percent by weight of each bar coming from an aluminum oxide. The aluminum oxide enables the bar 182 to maintain a higher tensile strength, a lower weight, and a more effective surface area for better high frequency current capability. The tensile strength is approximately 50 ksi, as opposed to 15 ksi, at 600° F.

Each of the electrically conductive bars 182 includes an outer end 184 and an inner end 186. The outer end 184 includes a width which is greater than the width of the inner end 186. The electrically conductive bars 182 have a tear-shaped cross-sectional area. As illustrated in FIG. 10, a notch 188 extends along the longitudinal length of the electrically conductive bar 182 at the outer end 184 thereof. The notch 188 is cut out of the outer end 184 to provide for thermal expansion of the electrically conductive bars 182 within the rotor 124 to minimize any hoop stress which may occur if the bars 182 were to thermally expand outwardly against the outer covering 181. It should be appreciated that the bars 182 provide for maximum current carrying capability.

As illustrated in FIGS. 5 and 13, end caps 190 extend around the end of the rotor 124. The end caps 190, one at each end of the rotor 124, electrically contact each of the bars 182. The end caps 190 include axial gaps 192 between the end bars 182 and rotor 124 to reduce the growth stresses due to thermal expansion. The end caps 190 are formed as a ring and made from a copper or copper with an aluminum oxide content as previously described. Each of the end caps 190 includes an outer frustoconical surface 194. Further, each of the end caps 190 has an inner end cap diameter 196 and an outer end cap diameter 198. The end caps 190 are preferably brazed to the bars 182 using a conventional silver braze alloy to provide structural integrity and low loss electrical connection. It should be appreciated that during the brazing process a molybdenum shim of 0.0005 inch thickness is placed between the copper and brazing electrode to eliminate bonding of the electrode to the copper.

Referring to FIGS. 5 and 13, a capture ring 191 is disposed within the end caps 190. The capture ring 191 is fastened to the rotor 124 by suitable means such as fasteners 191a. The capture ring 191 is made of a suitable material such as high strength steel or Aeromet 100 material. The capture ring 191 includes axial gaps 192 to allow axial growth phases due to thermal expansion. The capture ring 191 is attached to the rotor 124 to contain centrifugal growth and axial movement between the end caps 190 and the rotor 124.

Referring to FIG. 5, coolant fluid is used to cool the rotor 124. Coolant fluid is received by the induction motor 110 through the fluid port 120. A fluid channel 126 provides a pathway through which the fluid passes to a retaining ring 202. Once there, holes 200 in the retaining ring 202 capture the fluid as illustrated in FIG. 8. (The holes 200 and retaining ring 202 are shown on the output side but are identical on the input side.) The captured fluid rotates around the rotor shaft 177 until it is communicated to a pump channel 206. The pump channel 206 provides a pathway to pump 208 and 218 having a plurality of turbine blade-looking teeth 210, as best seen in FIG. 9. The pumps 208 and 218 are a Barske pump. The Barske pumps 208 and 218 are fit onto the rotor shaft 177 using an inconel ring (not shown) by cooling the Barske pump 208,218 in place over the rotor shaft 177.

In FIG. 5, the Barske pump 208 is capable of pumping the fluid to rotor cooling channels 212 (FIG. 5) via a connecting channel 214. A plurality of the rotor cooling channels 212 are shown in FIGS. 5 and 6. A return channel 216 returns the fluid, through the Barske pump 218, where it is exited through exit channel 220 and out the output port 222 for thermal exchange as illustrated in FIG. 5. The Barske pumps 208,218 produce a flow rate for the fluid of such volume that the fluid is capable of moving through the rotor 124 when it is rotating at high speeds without changing the phase of the fluid to a gas.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An induction motor comprising:

a stator defining stator inner and stator outer diameters extending about a longitudinal axis, said stator including a plurality of windings extending longitudinally and circumferentially about said longitudinal axis between said stator inner diameter and said stator outer diameter and passing an electric current therethrough to create a magnetic field;

a rotor extending along said longitudinal axis having a rotor length and a rotor outer diameter less than said stator inner diameter, said rotor being rotatable about said longitudinal axis relative to said stator, said rotor including at least one slot cut through said rotor length and at least one electrically conductive bar disposed within said at least one slot extending parallel to said longitudinal axis adjacent said rotor outer diameter for receiving an induced current due to the magnetic field, said at least one electrically conductive bar including a notch portion extending along a length of said electrically conductive bar for minimizing hoop stress due to thermal expansion;

an end cap at each axial end of said rotor contacting said at least one electrically conductive bar; and a capture ring attached to each axial end of said rotor to minimize centrifugal growth and axial movement of said end caps with respect to said rotor.

2. An induction motor as set forth in claim 1 wherein said end cap is made of either one of a copper or copper alloy material.

3. A motor vehicle comprising:

a chassis;

at least two wheels connected to said chassis;

an induction motor operatively connected to at least one of said two wheels to create a force to move said chassis, said induction motor including a stator defining stator inner and outer diameters extending about a longitudinal axis, said stator including a plurality of windings extending longitudinally and circumferentially about said longitudinal axis between said stator inner diameter and said stator outer diameter and passing an electric current therethrough to create a magnetic field;

a rotor extending along said longitudinal axis having a rotor length and a rotor outer diameter less than said stator inner diameter, said rotor being rotatable about said longitudinal axis relative to said stator, said rotor including at least one slot cut through said rotor length and at least one electrically conductive bar disposed within said at least one slot extending parallel to said longitudinal axis adjacent said rotor outer diameter for receiving an induced current due to the magnetic field said at least one electrically conductive bar including a notch portion extending along a length of said electrically conductive bar for minimizing hoop stress due to thermal expansion;

an end cap at each axial end of said rotor contacting said at least one electrically conductive bar; and a capture ring attached to each axial end of said rotor to minimize centrifugal growth and axial movement of said end caps with respect to said rotor.

4. A motor vehicle as set forth as set forth in claim 3 wherein said end cap is made of either one of a copper or copper alloy material.

5. A motor vehicle as set forth in claim 3 wherein said capture ring is made of a high strength steel material.

6. An induction motor as set forth in claim 1 wherein said end cap is comprised of aluminum oxide dispersed in a copper matrix.

7. An induction motor as set forth in claim 1 wherein said at least one electrically conductive bar is comprised of aluminum oxide dispersed in a copper matrix.

8. An induction motor comprising:

a stator defining stator inner and outer diameters extending about a longitudinal axis, said stator including a plurality of windings extending longitudinally and circumferentially about the longitudinal axis between said stator inner diameter and said stator outer diameter and passing an electric current therethrough to create a magnetic field;

a rotor extending along the longitudinal axis having a rotor length and a rotor outer diameter less than said stator inner diameter, said rotor being rotatable about the longitudinal axis relative to said stator, said rotor including at least one slot cut through the rotor length and at least one electrically conductive bar disposed within the at least one slot extending parallel to the longitudinal axis adjacent said rotor outer diameter for receiving an induced current due to the magnetic field;

an end cap at each end of said rotor contacting said at least one electrically conductive bar;

a capture ring attached to each end of said rotor to prevent movement of said end caps with respect to said rotor; and said end cap and said capture ring having an axial gap therebetween to reduce growth stresses due to thermal expansion.

* * * * *